US00RE34957E

United States Patent [19]

Francart, Jr.

[11] E Patent Number: Re. 34,957

[45] Reissued Date of Patent: May 30, 1995

[54] LEAK PROOF, PRELOADED, HIGH-BIASING FORCE FLOAT-OPERATED OVER-CENTER VALVE ACTUATING MECHANISM

[76] Inventor: Armand Francart, Jr., R.D. #2 Box 119Z. Rte. 896, Landenberg, Pa. 19350

[21] Appl. No.: 233,407

[22] Filed: Apr. 26, 1994

Related U.S. Patent Documents

Reissue of:

[64] Patent No.: 5,141,405
Issued: Aug. 25, 1992
Appl. No.: 795,155
Filed: Nov. 20, 1991

[51] Int. Cl.[6] ..... F04B 9/08
[52] U.S. Cl. ..... 417/133
[58] Field of Search ..... 417/133

[56] References Cited

U.S. PATENT DOCUMENTS

| | | | |
|---|---|---|---|
| 1,285,256 | 11/1918 | Lewis | 417/133 |
| 1,406,157 | 2/1922 | Coulombe | 417/133 |
| 1,446,902 | 2/1923 | Jacobsen | 417/133 |
| 1,530,218 | 3/1925 | Stuber | 417/133 |
| 1,561,159 | 11/1925 | Hurst | 417/133 |
| 1,635,692 | 7/1927 | Schweisthal | 417/133 |
| 1,712,985 | 5/1929 | Ellberg et al. | 417/133 |
| 2,172,110 | 9/1939 | Sabin | 417/133 |
| 2,394,169 | 2/1946 | Gray et al. | 417/133 |
| 3,242,873 | 3/1966 | Smith | 417/133 |

*Primary Examiner*—Richard A. Bertsch
*Assistant Examiner*—Howard R. Richman
*Attorney, Agent, or Firm*—Sughrue, Mion, Zinn, Macpeak & Seas

[57] ABSTRACT

A snap-over toggle linkage valve actuating mechanism for alternately opening and closing a gas inlet valve and a gas outlet valve, has a pair of spring preload arms pivotably mounted to a fixed mainframe within a sealed pressure vessel for pivoting about a first pivot axis. A first toggle link is pivoted at a first end to the mainframe about the pivot axis A. A second toggle link preferably a compression coil spring under precompression is pivoted at one end about a second pivot axis C parallel to the first pivot axis A on said pair of spring preload arms. The second end of the first toggle link is pivoted to a second end of the second toggle link for pivoting about a third axis B parallel to axes A and C. The second toggle link constantly applies a compressive force on the pivot connection between the first and second toggle links such that a float within the vessel as a result of rise and fall of the liquid pivots the spring preload arms toward a position of longitudinal alignment with the longitudinal axis of the spring preload arms with an increasing compressive force applied to the first toggle link to maintain the first toggle link stationary in one of two oblique, over-center positions with respect to a center line Y extending parallel to the longitudinal axis of the spring preload arms with the second toggle link pivoting about the axis B and being axially compressed until the first and second links move across the center line Y. At that time, both toggle links instantly snap over into oppositely oblique, over-counter positions. The compressive force of the second toggle line may be variably adjusted.

25 Claims, 3 Drawing Sheets

FIG. 1
PRIOR ART
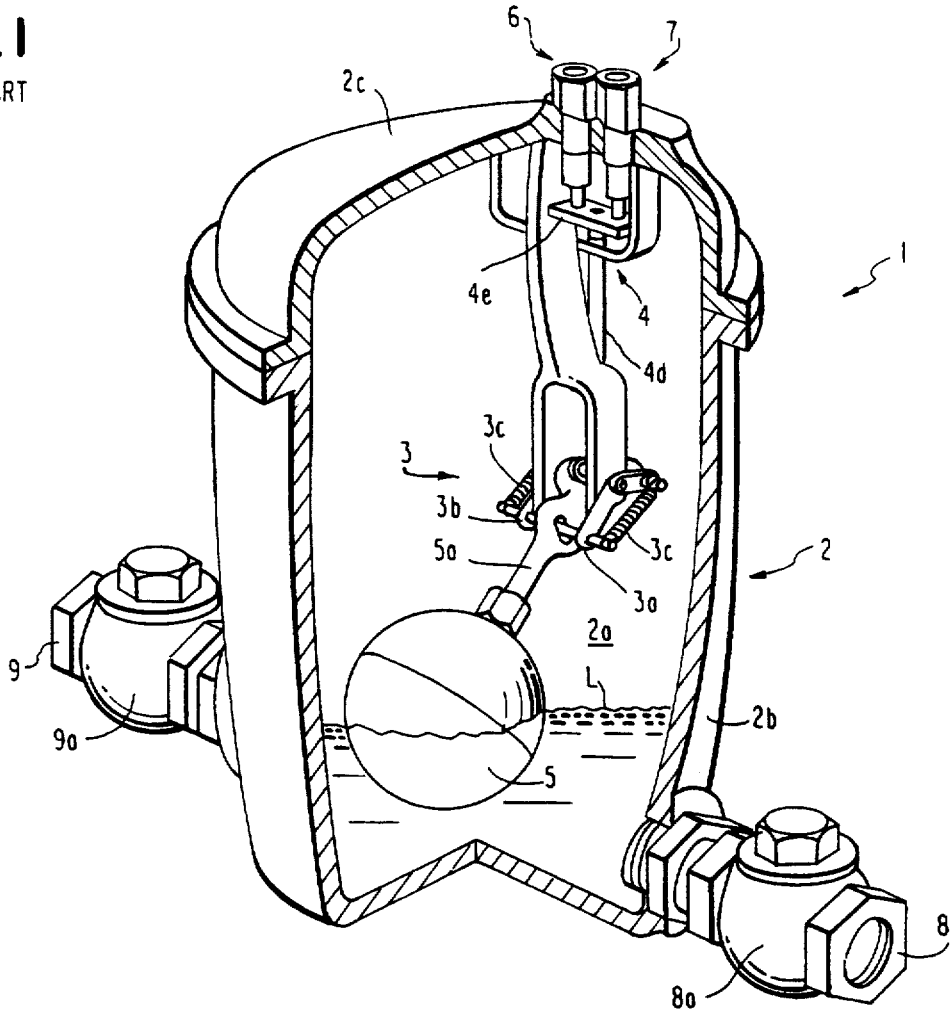
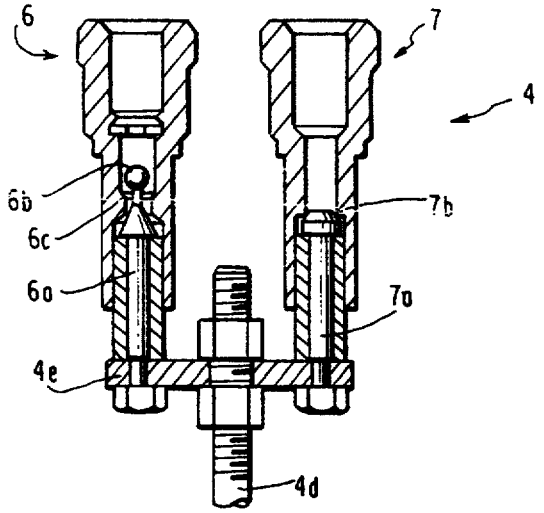
FIG. 1A
PRIOR ART

LEAK PROOF, PRELOADED, HIGH-BIASING FORCE FLOAT-OPERATED OVER-CENTER VALVE ACTUATING MECHANISM

Matter enclosed in heavy brackets [ ] appears in the original patent but forms no part of this reissue specification; matter printed in italics indicates the additions made by reissue.

FIELD OF THE INVENTION

This invention pertains to float-operated over-center valve actuating mechanisms for liquid pumping systems where a pressure vessel is alternately filled with a liquid and emptied with pump operation controlled by the level of liquid such as a condensate accumulating within the pressure vessel, and more particularly to a float-operated over-center valve actuating mechanism which subjects oppositely acting chamber vent and operating gas pressure inlet valves to a high compressive preload force which increases as the mechanism toggle linkage moves alternately across an over-center position.

BACKGROUND OF THE INVENTION

Such over-center float-operated valve actuating mechanisms are useful in controlling the filling of a closed or sealed pressure vessel and in which the vessel includes a vent valve for venting the interior of the vessel to the atmosphere and a second pressure valve subjected to high pressure inlet fluid, such as live steam at 100 to 500 psi, to drive an accumulated liquid periodically from said vessel. In filling such vessel, the vent valve is in the open position and the pressure valve is closed by the single-float operated over-center valve actuating mechanism. As the vessel fills with liquid, the float rises and a rotatable float arm, forming part of the valve actuating mechanism, is swung or rotated about a pivot point at one end thereof remote from the float, causing an over-center toggle linkage mechanism to move toward the center position against a spring bias. Such a mechanism has toggle linkage elements which snap quickly through the center position, closing the vent valve simultaneously with snap opening of the high pressure inlet valve to pump the accumulated liquid from the vessel.

Typically, a tension coil spring provides such biasing force with one end of the coil spring coupled to a fixed or stationary member of the valve mechanism or vessel. In other cases, such tension coil spring is coupled at opposite ends to moveable elements of the valve actuating mechanism.

U.S. patents representative of the state of the art with respect to snap-acting, over-center valve actuating mechanisms particularly useful in periodically filling a vessel with liquid while venting the same and closure of the vent valve upon filling of the liquid to a degree effecting actuation of the over-center valve actuating mechanism and to permit fluid pressure pumping by positive pressure or vacuum pressure of the accumulated liquid from the vessel are the following:

U.S. Pat. No. 1,285,256, issued Nov. 19, 1918, entitled "Liquid Feeding Device"

U.S. Pat. No. 1,406,157, issued Feb. 7, 1922, entitled "Fuel Feeding System for Internal Combustion Engines"

U.S. Pat. No. 1,446,902, issued Feb. 27, 1923, entitled "Vacuum Feeding Device"

U.S. Pat. No. 1,530,218, issued Mar. 17, 1925, entitled "Fluid Supply Apparatus"

U.S. Pat. No. 1,561,159, issued Nov. 10, 1925, entitled "Liquid Level Maintaining Device"

U.S. Pat. No. 1,635,692, issued Jul. 12, 1927, entitled "Valve Snap Action"

U.S. Pat. No. 1,712,985, issued May 14, 1929, entitled "Vacuum Tank"

U.S. Pat. No. 2,172,110, issued Sept. 5, 1939, entitled "Pump"

U.S. Pat. No. 2,394,169, issued Feb. 5, 1946, entitled "Compressed Air Coolant Circulatory Pump"

U.S. Pat. No. 3,242,873, issued Mar. 29, 1966, entitled "Automatic Bilge Pump"

While such over-center snap-acting valve mechanisms for steam condensate pumps and fuel feeding systems operate satisfactorily to automatically control the liquid feed to and discharge from the pressure vessels, such known mechanisms are complex and expensive, fail to ensure maintaining the two alternately openable and closable valves in full, high-pressure biased, closed condition when closed, or fully open, when open. Particularly, the snap-acting movable valve mechanisms tend to move prior to the over-center toggle linkage mechanisms reaching the center line position where snap action, multi-valve state reversal occurs.

It is, therefore, a primary object of the present invention to provide an improved snap-acting, over-center valve actuating mechanism particularly useful for simultaneous activation and alternating reversal of a normally open valve and a normally closed valve which alternately open and close in both directions of movement of a snap over, toggle linkage, wherein the mechanism is of low cost, of simplified construction, and which preferably employs a relatively short axial length, stiff compression coil spring having a large spring constant and being subject to spring preloading, and in which the compressive biasing force of the spring is maintained at all times to ensure that the normally closed valve remains closed under a high-biasing force, and the normally open valve remains open, and with movement of the toggle linkage mechanism limited to low friction pivoting of the coil spring about both ends thereof, as one of two toggle links, until the toggle linkage reaches the center line position at which point the toggle linkage rapidly snaps across the mechanism center line.

BRIEF DESCRIPTION OF THE DRAWINGS

FIG. 1 is a perspective view, partially broken away, of a gas pressure powered liquid pump incorporating a float-operated, over-center toggle linkage, valve actuating mechanism of the prior art.

FIG. 1A is a vertical sectional view of oppositely acting double valve assembly of a portion of the gas pressure powered liquid pump 1 taken about 1-A-1-A of FIG. 1.

DETAILED DESCRIPTION OF THE PREFERRED EMBODIMENTS

Figure 2:
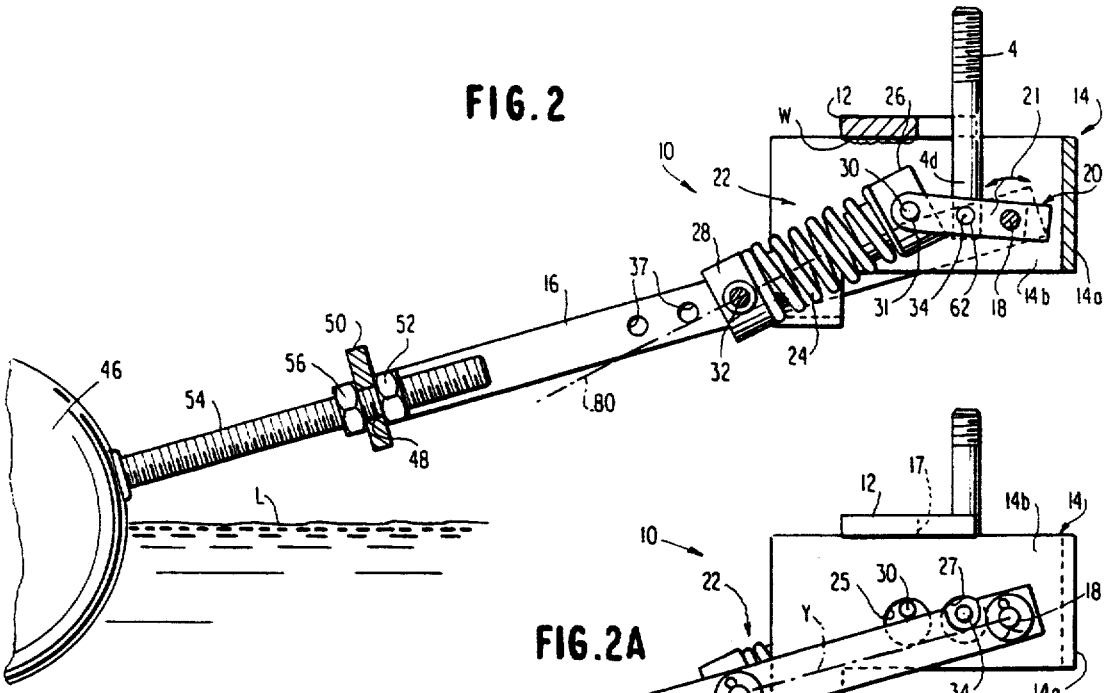
FIG. 2 is a side elevational view partially broken away, of an improved leak proof, high-biasing force, float-operated over-center valve actuating mechanism within a liquid pump pressure vessel and forming a preferred embodiment of the present invention, in gas pressure inlet valve closed position.

FIGS. 1 and 1A illustrate a typical gas pressure powered liquid pump, indicated generally, at 1 and which is formed principally by a sealed pressure vessel 2 having a body 2b mounting internally, a prior art float-operated, over-center toggle linkage valve actuating mechanism indicated generally at 3 as mounted to the pressure vessel cover or lid 2c. That over-center toggle link mechanism 3 operates an operating valve assembly, indicated generally at 4, fixedly mounted to the cover of the pressure vessel 1. The over-center toggle linkage valve actuating mechanism 3 is actuated by a float 5 to change the state of a steam (or other high pressure gas) normally closed, gas inlet valve 6, and a pressure vessel chamber, normally open, gas exhaust or vent valve 7. Mounted to opposite sides of the pressure vessel 2 at the bottom are a liquid inlet 8 and a liquid outlet 9. The liquid inlet includes a normally open inlet check valve 8a preventing liquid, which accumulates within the pressure vessel chamber 2a, from exiting through the inlet check valve 8 upon gas pressurization of the pressure vessel chamber 2a, above the level of the liquid accumulating therein. The liquid outlet 9 includes a normally closed liquid outlet check valve 9a which opens at a given high gas pressure to effect periodic gas pressure pumping or discharge of accumulated liquid L within a chamber 2a.

In the normal position before start-up, the float 5 is at its lowest position, as shown in FIG. 1, with gas (steam) inlet valve 6 closed and the chamber gas exhaust or vent valve 7 open. When liquid flows by gravity through the inlet check valve 8 into the pump or pressure vessel 2, the float 5 will become buoyant and rise. As the float 5 continues to rise, it rotates about a pivot axis and the float arm 5a engages one of the toggle links 3a, 3b of the toggle link over-center mechanism 3, increasing the tension of dual coil springs 3c. When the float 5 has risen to its upper tripping position, the energy stored in the tension springs 3c by expansion is released instantly, causing both sets of toggle links 3a, 3b to snap upwards, over center, relative to a center line between the pivot coupling of the links 3a, 3b at ends opposite to the common pivot connection between the links 3a, 3b.

When the links 3a, 3b snap over such link in-line position, they move into oppositely upward oblique positions which, in turn, causes a valve push rod or actuator rod 4d, operatively coupled thereto, to simultaneously open the gas pressure (steam) inlet valve 6 and to close the chamber 2a gas exhaust or vent valve 7. In effecting that action, a plate 4e coupled to the upper end of the valve plush rod 4a raises a vertical pin 6a, FIG. 1A, thereby driving an inlet ball 6b off of an annular seat 6c of the steam inlet valve 6.

Plate 4e is also engaged with the lower end of a movable valve member or pin 7a of the gas vent valve 7 which is driven upwardly into sealing engagement with seat 7b of the gas vent valve to close off the gas exhaust outlet to the chamber 2a.

Steam (or other high pressure gas) flows through inlet 6d, the gas inlet valve 6 and develops a pressure within the pressure vessel of sufficient magnitude to pump the accumulated liquid through the discharge check valve 9a. The normally open inlet check valve 8 closes during the pump discharge cycle.

As the liquid level L in the pump pressure vessel chamber 2a decreases, the float 5 drops. Before the float 5 reaches its lowest position, the float arm 5a engages links 3a of the over-center toggle linkage valve actuating mechanism 3, increasing the tension in the tension coil springs 3c. When the float drops to its lower tripping position in chamber 2a, the energy stored by the expansion of the springs 3c is released instantaneously, causing the sets of toggle links 3a, 3b to snap over center in downwardly oblique, opposite directions. The push rod 4d acts to open the closed vent valve by driving the moving valve member 7a of the vent valve downwardly off seat 7b and driving the steam inlet valve pin 6a downwardly until the separate steam inlet valve ball 6b seats on valve seat 6c. Ball 6b is maintained sealed thereon by the high pressure steam within the operating pressure inlet valve 6 of operating valve assembly 4.

Liquid L again flowing by gravity or otherwise through the inlet check valve 8 tends to fill the pump chamber 2a of the pressure vessel 2, and the cycle is repeated.

Figure 3:
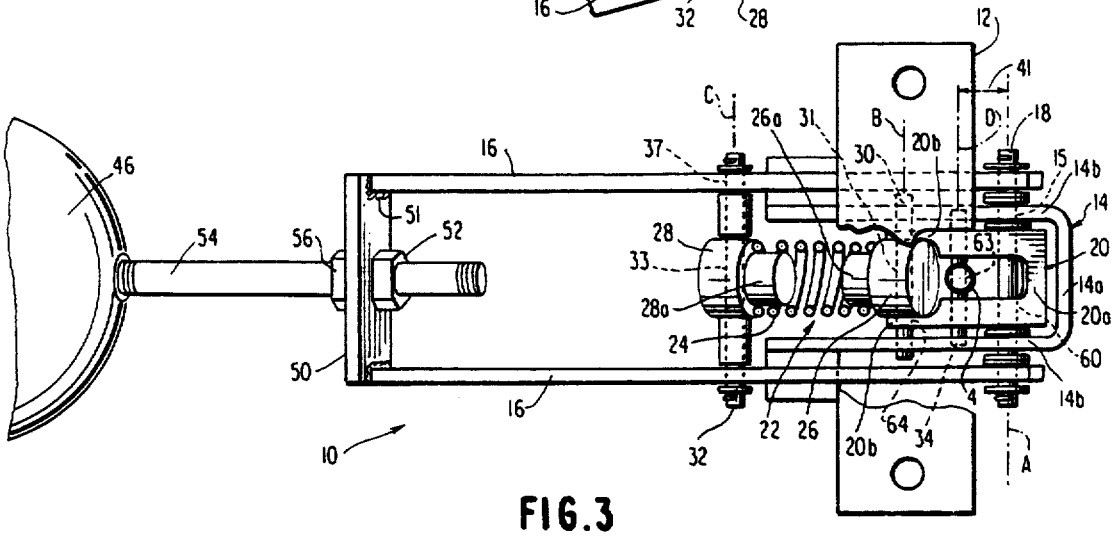
FIG. 3 is a top plan view of the mechanism of FIG. 2.
Figure 4A:
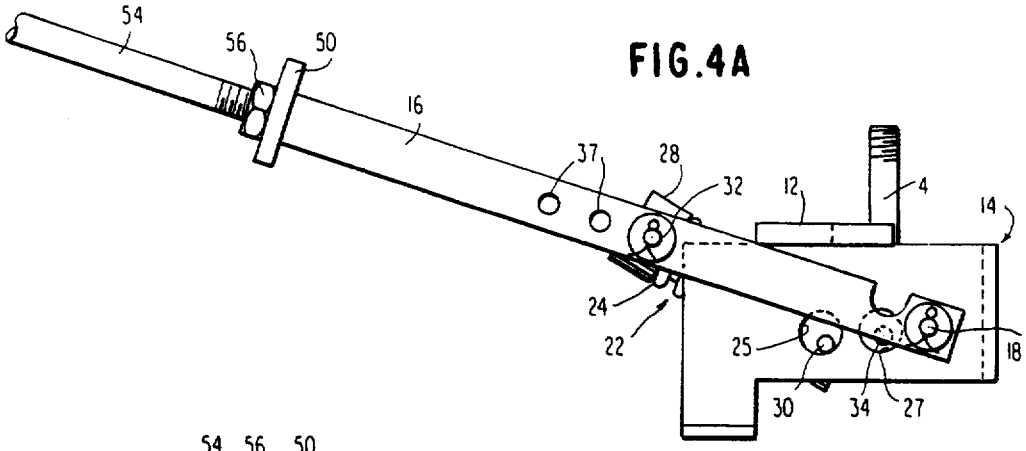
FIG. 4A is a side elevational view of a portion of the mechanism of FIG. 2, corresponding to FIG. 4.
Figure 4:
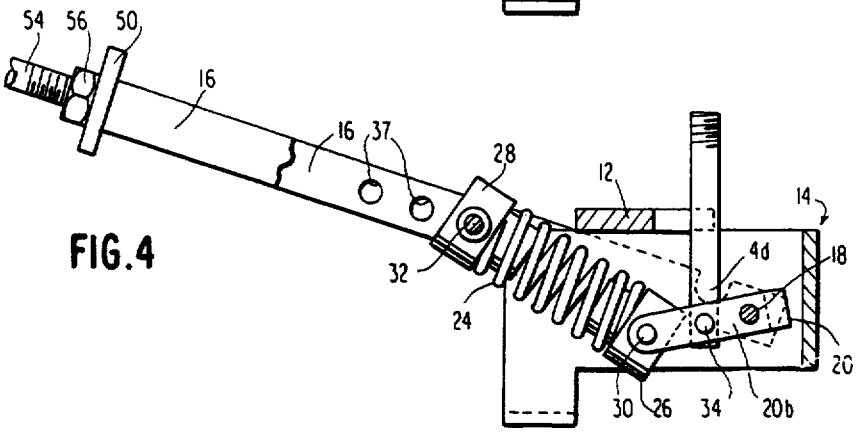
FIG. 4 is a perspective view of the valve actuating mechanism of FIGS. 2 and 3, in gas pressure inlet valve open position.

Referring to FIGS. 2 through 4 inclusive, a leak proof, float-operated, high-biasing force, preloaded float-operated over-center toggle linkage valve actuating mechanism 10, forming one embodiment of the invention, is illustrated as having application to the simultaneous opening and closing, alternatively, of valves 6 and 7, FIG. 1A of valve assembly 4, which are identical to valves 6 and 7 of the prior art pump 1 of FIGS. 1 and 1A. Elements in the embodiment of this invention common to the liquid pump of FIG. 1 and 1A are given like numerical designations. The leak proof, preloaded, high-biasing force, float-operated over-center toggle linkage valve actuating mechanism 10, forming a preformed embodiment of the present invention replaces the mechanism 4 of pressure pump 1 of FIG. 1. It includes a horizontal base plate 12 which acts to support the mechanism 10 within a sealed vessel or pump body 2b, that vessel being indicated generally at 2, FIG. 1, and defining with cover or lid 2c a sealed chamber 2a capable of holding an accumulation of liquid L therein. Plate 12 is fixed to the interior of lid 2c.

The over-center valve actuating mechanism 10 is comprised of a fixed mainframe 14, of cast or formed sheet metal of U-shape plan configuration having a base portion or rear wall 14a integral with a pair of vertical, laterally opposed side walls 14b. Such U-shape member may be welded at W, or otherwise fixed to the base plate 12, on the lower surface of the same. A hole 17 within the base plate permits an actuator or push rod 4d to project therethrough. A horizontal pivot pin 18 is fixedly mounted to the mainframe 14, passing through aligned apertures or holes 15 within opposite side walls 14b of the fixed mainframe. Pivotably mounted to respective outboard ends 18a of pin 18 are a pair of spring preload or compression force preload arms 16 which extend along respective side walls 14b of the mainframe 14 and which rotate about the axis A of pin 18. The arms 16 extend a considerable distance beyond the end of the side walls 14b of the mainframe. The outboard ends 16b of the spring preload arms 16 are joined by a transverse crossbar 50, whose ends may be welded as by way of welds 51, to the inside surface of respective arms 16. In the embodiment of the invention of FIGS. 2, 3 and 4, the spring preload and swing arms are coupled directly to a float 46, such as a hollow metal ball of spherical form, having rigid fixed thereto and projecting radially outwardly therefrom, a threaded stem or rod 54. A small diameter circular hole 48 is formed within the center of crossbar 50 such that the terminal end of the threaded rod 54, which is sized slightly small than the diameter of hole 48, passes therethrough. A pair of lock nuts 52, 56 are threaded on the rod 54, and are locked tightly against respective opposite sides of the crossbar 50 to frictionally lock the rod 54 to the crossbar. As a liquid L, the fills the chamber 2a, the float 46 rises and the spring preload arms 16 rotate counterclockwise, FIG. 2, about axis A.

The pivot pin 18 also pivotally supports one end of a U-shaped lever or yoke indicated generally at 20 of flat metal bar stock, having a base 20a at one end, adjacent the pivot pin 18, from which extend, at right angles, integral, laterally opposed arms 20b, which are spaced some distance from each other. The yoke arms 20b are provided with aligned holes or bores at 60, sized slightly larger than the diameter of the pivot pin 18, such that the yoke may pivot about the axis A of pin 18 commonly with the spring preload arms 16, as indicated by arrow 21, FIG. 2. A second pair of aligned bores 62 are provided within the opposite arms 20b of the yoke through which pass a pivot pin 34. The pivot pin 34 may be frictionally fit within the holes 62. A lower end of the valve actuator rod 4d is provided with a small diameter hole 63 transversely at right angles to its axis from one side to the other, through which hole the pin 34 passes, with pivot pin 34 being of a slightly smaller diameter than the hole 63 such that the valve push road 4d is pivoted thereon.

The yoke 20 is further provided with a third pair of laterally opposed aligned holes 64, within arms 20b thereof, at ends remote from base 20a through which pass yet a third pin 30. Pin 30 is sized to the holes 64 such that the pivot pin 30 makes a frictional fit with the opposite arms 20b of the yoke. Pivot pin 30 mounts for rotation, about the pin axis B, one end of a compression coil spring assembly 22. A spring cylindrical end cap 26 has a transverse internal bore extending from one side to the other as at 31, which is slightly larger than the diameter of the pivot pin 30. The cylindrical end cap 26 is stepped with a reduced diameter portion 26a sized slightly smaller in diameter than the internal diameter of the compression coil spring 24, within the end of which it is inserted. The coil spring 24 forms a primary element of the coil spring assembly 22, and one link of a two link toggle linkage 25. A mirror image spring end cap 28 to that at 26 is provided at the opposite end of the coil spring 24. In this case, it is pivoted about the axis of a circular bore or hole 33 running transversly through the center of the same, which hole 33 receives a pivot pin 32 whose diameter is slightly less than the diameter of bore 33. The end cap 28 includes a reduced diameter portion 28a sized to and received in the end of the coil spring 24, proximate to float 46. Further, the spring preload arms 16 are each provided with holes 37 at corresponding aligned longitudinal positions, which are of a diameter equal to or slightly smaller than the diameter of the pivot pin 32. The pivot pin 32 is frictionally maintained in position on arms 16, but permits low friction pivoting of the end cap 28 at that end of the coil spring 24 and captured thereby, about a pivot axis C, coincident with the axis of pivot pin 32. The coil spring 24 is purposely sized such that the diameter of the turns of the coil spring are large, the overall coil spring length is short, and the spring constant thereof is quite large. Thus, as a result, in the spring assembly 22 as shown in FIGS. 1 and 2, there is preset an initial axial compression of the coil spring 24 to preload the spring 24 by selective placement of pivot pin 32 in a given set of laterally aligned holes 37 within arms 16. With a high compression biasing force acting via the pivot pin 32 against the outboard end 20b' of the yoke arms 20b, a component thereof acts through the valve actuator rod 4, and via the plate 4e on the movable valve pins 6a, 7a, of the dual, oppositely-acting, normally closed and normally open gas inlet valve 5 and gas vent valve 6, respectively, FIG. 1A.

The operation involves common vertical movement of the two moveable valve members at the instant of snap action over-center passage of the two pivotably coupled toggle linkage 25 members, i.e., yoke 20 and spring assembly 22, of the float-operated over-center valve actuating mechanism 10. As in the prior art, FIG. 1A, in FIGS. 2, 3 and 4, the gas inlet valve 6 is a normally closed valve, while gas vent valve 7 is normally open.

In terms of physical distance, the distance X between the pivot axis D for pin 34 pivotably coupling the lower end of the valve actuator rod 4d to the lever or yoke 20, from pivot axis A of pivot pin 18 of the yoke to the mainframe 14 is shown as quite short, as indicated by the double-headed arrow, FIG. 3. However, this distance X may readily vary, depending upon the length of stroke desired for the movable valve members, as at 6a, 7a for respective valves 6, 7. Placement of the pivot pin 34 further away from the pivot pin 18 results in greater travel of the valve actuator rod 4d and, thus, movable valve members 6a, 7a as a result of snap over the toggle linkage yoke 20 and spring assembly 22.

Importantly, however, there is no movement whatsoever of the yoke 20 once it reaches either extreme over-center, oblique positions shown respectively in FIGS. 2 and 4 until the succeeding snap over center movement of the toggle linkage 25. This occurs, when the float moves as a result of a rising level L of liquid within the tank, or drop in the same, to the point where a center line 80 for the spring assembly 22, i.e., passing through the axes, B, C, of pivot pins 30, 32, is in line with a toggle linkage mechanism center line Y passing through the axes of pivot pins 18, 32 (aligned with the longitudinal axis of the spring preload arms 16).

As may be appreciated, the pivot connection at pivot pin 32 for end cap 28 at one end of the coil spring 24 and the spring preload arms 16, and the pivot connection at pin 18 between those arms 16 and the fixed mainframe 14 is such that the coil spring assembly 22 pivots easily, with low frictional restraint about pin 32 and follows the rise or fall of the float and rotation of the spring preload arms 16 about pivot axis A. The opposite end of the coil spring 24, via end cap 26, is freely pivoted, with low friction, about axis B of pin 30, forming a pivot pin connection between the outboard end 20b' of the yoke 20 and coil spring assembly 22. Further the coil spring 24 is trapped between and will, at the center position, have its axis 80 aligned with the mechanism center line Y passing through the yoke, from pivot pin 30, at pivot axis B, to pivot pin 18 and axis A, common with the pivot axis of the spring preload and swing arm 16.

Assuming that the float is rising as liquid L accumulates within chamber 2a, immediately after passing through center line Y position, the spring 24, which is in its maximum compressed condition and has its maximum biasing force acting through yoke 20 on the valve actuating rod or push rod 4d, will expand, driving the yoke 20 obliquely downwardly about pivot axis A and in a counterclockwise direction from that shown in FIG. 2. At the same time, the coil spring 24 will have its upwardly oblique axis, per FIG. 2, change to an downwardly, oppositely oblique, orientation relative to that of the longitudinal center line Y through yoke 20, as seen in FIG. 4. Such opposite movements to a controlled coil spring expansion (but not fully relaxed condition) for coil spring 24 may be partially or wholly limited by a pair of aligned, circular holes 25 within the opposite sides 14b of the mainframe 14. These holes are aligned with the arcuate sweep of the pivot axis B of pivot pin 30. Further, the pivot pin 30 is of such an axial length as to have its ends project through the holes 25 within the opposite sides 14b of the mainframe, but stopping short of the inside surfaces of respective laterally opposed spring preload arms 16.

Further, there are a pair of companion holes 27 which may be the same diameter of slightly small than holes 23 within respective sidewalls 14b of the mainframe 14, aligned with pin 34 forming pivot axis D for valve actuating rod or push rod 36. However, these holes 27 do not act in part or in whole as physical stops for the pin 34 since pin 34 is of a length such that it does not extend beyond the laterally outside surface of yoke sides 20b. Holes 27 permit entry of a tool for removing or inserting pivot pin 34.

Figure 2A:
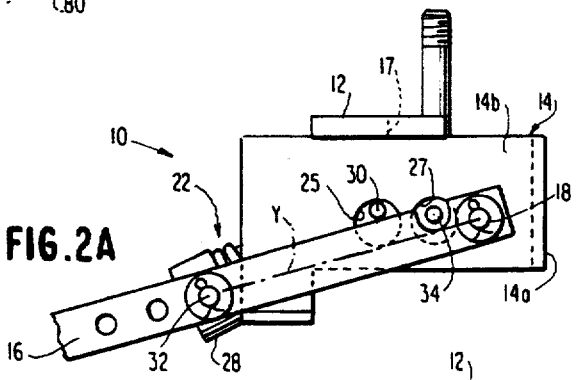
FIG. 2A is a side elevational view of a portion of the mechanism of FIG. 2.

To the contrary, the opposite ends of pivot pin 30 preferably contact the periphery of the holes 23 at the bottom of those holes, but not the top of those holes, when the spring assembly 22 snaps over the center line Y to limit expansion of the coil spring 24 and to maintain a predetermined high-biasing compression preload force acting on the valve stems 6a, 7a to maintain them respectively in their normally full open and closed positions, respectively, as shown per FIG. 2. The ends of pin 30 contact the bottom of holes 23 to stop further over-center toggle movement of the end cap 26 and the yoke 20 forming the pivot connection via pin 30 to the spring assembly 22. Preferably, in passing through the center line Y, FIG. 3, in the opposite direction during rise of hollow float 46 such that inlet valve 6 opens and vent valve 7 closes, the upper end of the valve stem 7a abuts valve seat 7b, physically stopping further movement of the movable members of the valve mechanism 10 without the ends of pivot pin 30 bottoming out against the top of the circular holes 25 within the laterally opposed side walls 14b of the mainframe. Thus, preferably as per FIG. 4, there is a small gap G between the top of the pin 30 and the top of the holes 25 within mainframe side walls 14b, FIG. 2A.

As may be appreciated, other arrangements may be made for physically preventing full expansion of coil spring 24 and excessive over center movement of toggle linkage members such as coil spring assembly 22 and yoke 20 of the over-center valve actuating mechanism 10.

It should be kept in mind that, both for the embodiment of FIGS. 2–4 inclusive (and that of the second embodiment of FIG. 5), the float-operated over-center valve actuating mechanism 10 may be readily inverted with operation being essentially the same and in which case a vertically suspended valve actuator 20 or push rod 4a, FIG. 1, would be positioned on the opposite side of the yoke, as would valves 6, 7, etc. The number of valves actuated by the over-center, snap-acting toggle linkage mechanism 10 may be in excess of two.

Figure 5:
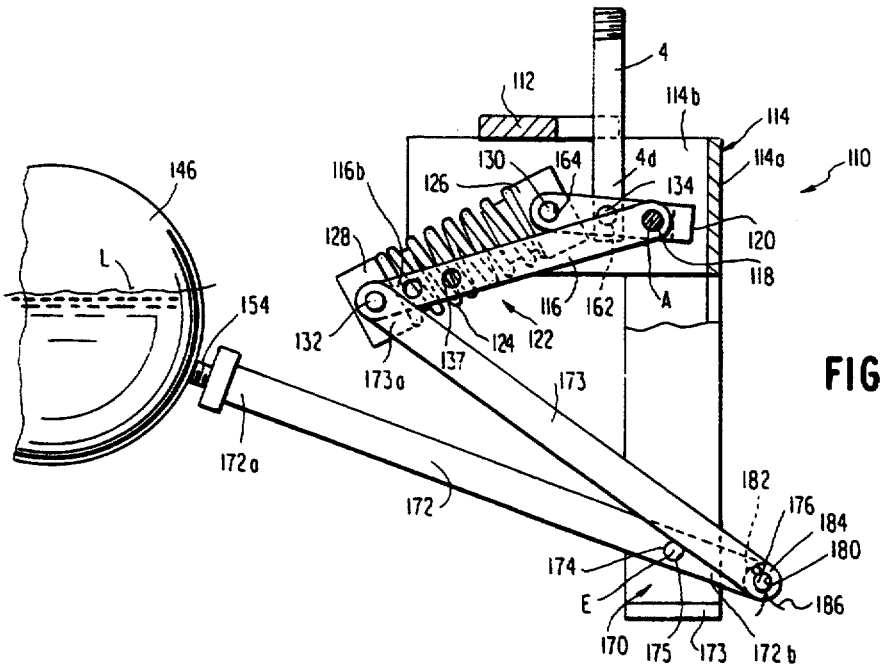
FIG. 5 is a side elevational view of a second embodiment of the over-center valve actuating mechanism of the present invention, in gas pressure inlet valve closed position as applied to a liquid pump.

Turning next to the second embodiment of the invention, a float-operated over-center valve actuating mechanism 110 is illustrated in FIG. 5 as incorporating a force amplification system 170 applied essentially to the same toggle linkage, over-center mechanism, as employed at 10 in the embodiment of FIGS. 2–4 inclusive. In this embodiment, like elements to the first embodiment bear similar numerals, but with a 1 added thereto. For instance, the valve actuating mechanism is generally indicated at 110, in contrast to the numeral 10 for the like mechanism of the first embodiment.

For simplicity purposes, the valve actuating mechanism 110 is oriented similarly to that of the first embodiment and with a base plate 112 overlying a vertically upright mainframe 114, which is of U-shaped plan configuration, comprised of a rear wall or base 114a, and laterally opposed, vertical side walls 114b. In this case, the side walls 114b are not of rectangular shape, but are L-shaped, being much wider at the top than at the bottom. The bottom of the mainframe side walls 114b extends proximate to mainframe rear wall 114a such that the force amplification mechanism indicated generally at 170 is mounted thereto. Mechanism 170 is comprised of a float arm 172 and a pair of crank arms 173. Float arm 172 is pivotably mounted by way of a pivot pin 174 for rotation about a horizontal axis E and centered near the bottom of the two vertical side walls 114b of the mainframe 114. Parallel to base plate 112, the mainframe 114 includes a horizontal transversely extending bottom plate 173 which joins the mainframe side walls 114b together at the bottom. Such bottom plate 173 may be integrally formed by bending a strip of sheet metal to form the mainframe 114. Alternatively, the bottom plate 173 may be welded thereto, between laterally spaced sidewalls 114b, similar to the welds W which weld the base plate 12 to the mainframe 14.

In such case, a piece of sheet metal may be employed separate from the mainframe 114 and having the ends thereof welded to opposite sides 114b of that mainframe. The result is to create a strong, rigid stationary structure for supporting the moving elements of the over-center wave actuating mechanism 110. Preferably, a pivot pin 174 sized slightly larger than the circular holes 175 within the mainframe side 114b passes through the holes 175. It extends only slightly beyond the exterior surfaces of the laterally opposed sides 114b of the mainframe. The float arm 172 takes the form of a piece of metal bar stock such as steel, although other materials may be employed of lighter weight, and the single piece of bar stock may be replaced by relatively thin metal strips. In the illustrated embodiment, the lateral width of the float arm 172 is slightly less than the lateral distance between the mainframe side walls 114b. A hole is drilled transversely through the longitudinal center of the float arm from one side to the other of a diameter slightly larger than the diameter of the pivot pin 174 which passes therethrough. The result is to permit the float arm 172 to pivot about axis E on the fixed pivot pin 174. At the outboard end 172a of the float arm, there is integrally formed a threaded coupling rod 154 whose axis is coincident with the longitudinal center line of the float arm. Threaded to the rod 154 is a hollow float 146. The hollow float 146 may be formed of metal and may have internally tapped bore through the wall of the same threaded onto the exterior threads of the threaded rod 174. Alternatively, a nut may be welded to the exterior of the float 146 with the threaded rod 154 threaded to the nut.

In the illustrated embodiment, FIG. 5, the float arm 172 carries a transverse bore 180, adjacent an inboard end 172b, from one side of the float arm to the other, that bore being sized to receive a slightly smaller diameter pivot pin 176 which projects outwardly from opposite sides of the float arm 172 well beyond the exterior surfaces of the mainframe side walls 114b. The pivot pin 176 pivotably supports a pair of crank arms 173 to opposite sides of, and to the outside of, the mainframe 114. Interposed between the float arm 172 and the crank arms 173 are tubular spacers 182 maintaining the lateral spacing between the laterally opposed crank arms 173 at their upper ends. Washers 184 are preferably mounted to the ends of the pivot pin 176 and cotter pins are passed through small diameter holes extending through the pivot pin 176 from one side to the other, outside of the washers 184, to maintain the washers in place and to prevent disconnecting of the crank arms from their connection to float arm 172. While not shown, cotter pins and washers are employed on all of the other pivot pins between the crank arms 173 and the spring preload arms 116, and on pivot pin 118, which pivotably connects the inboard end of the spring preload arms 116 to the mainframe 114. The washers 184 and the cotter pins 186 are illustrated in FIG. 3 as carried by and mounted to pivot pins 132, 118, respectively.

The balance of the leak proof high-biasing force adjustable preloading, float-operated over-center valve actuating mechanism 110 is identical to that of the first embodiment, FIGS. 1–4 inclusive.

The over-center valve actuating mechanism 110, which has the larger width mainframe portion welded at 171 beneath the bottom of plate 112, preferably has the valve actuator or push rod 4d passing upwardly through a slightly larger diameter hole 117 and which, in accordance with the first embodiment of the invention, has a transverse plate as at 4e. FIG. 1A, fixedly mounted thereto and preferably by means permitting the adjustment of that plate along the axis of the valve actuator rod or push rod 4d. Actuator rod 4d is pin connected by a pin 134 to the yoke of lever, indicated generally at 120. Pin 134 passes through a small diameter hole 163 running from one side of the yoke to the other. The yoke or lever 120 is pivotably mounted to the mainframe 1114 by means of a horizontal pivot pin 118 which is fixedly mounted to the mainframe 114, passing through aligned apertures or holes 115 within laterally opposed side walls 114b of that fixed mainframe. In like manner to the first embodiment, the horizontal pivot pin 18 is of a diameter slightly less than the diameter of the hole 160 within the yoke or lever 120 such that the yoke or lever pivots on pin 118 about a pivot axis A. Further, the ends 118a of the pivot pin 118 project beyond the side walls 114b of the mainframe 114. Pivotably mounted to respective outboard ends 118a of pin 118 are a pair of spring preload arms or compressive force preload arms 116 which extend parallel along and outwardly of respective side walls 114b of the mainframe 14. These arms also swing about axis A. Washers may be mounted to the outboard ends of pin 118 to the outside of the arms 16 and cotter pins extended through small diameter holes within pin 118, diametrically through the axis A.

Unlike the prior embodiment, the spring preload arms 16 are not coupled directly to float 146; rather, they are pivotably connected to respective crank arms 173. The crank arm ends 173a are pivotably connected by pivot pin 132 to the outside of the outboard ends 116b of the spring preload and swing arms 16 remote from pivot pin 118. The pivot pin 132 carries on opposite ends a washer and a cotter pin in the same manner as the other connections between the movable members and the pivot pins, with holes within the outboard ends 173a of the crank arms, and the spring preload and swing arms 116 so that these arms may freely rotate about the periphery of the pivot pin 132. Likewise, that pivot pin 132 passes through a small diameter bore or hole from one lateral side to the other of spring end cap 128, all in accordance with the first embodiment of this invention. The end cap 128 again is stepped so as to receive one end of the coil spring 124 and forms, with that coil spring, and a second end cap 126, mounted thereto in the fashion of the first embodiment, a compression coil spring assembly 122. The coil spring 124 may be preloaded by shifting the pivot pin location for pivot pin 132 closer to the pivot pin 118 within appropriate, laterally aligned, small diameter holes 137 of arms 116. The result of this is to compress the coil spring 124, preloading the same, when end cap 126 is pin mounted to the end of the yoke or lever 114 remote from its pivot connection via pivot pin 118 to the mainframe 114. Preferably, a small diameter hole 164 is formed within the yoke 120, passing through both arms and through the longitudinal center line of the yoke, and being of a diameter slightly larger than the diameter of a pivot pin 130. Thus, the end cap 126 may rotate relatively freely about the outer periphery of the pivot pin 130 which defines a third pivot axis B between the yoke 120 and end cap 126 of the spring assembly 122.

Yoke 120 is further provided with a pair of laterally opposed aligned holes 162 within opposite arms 120b through which pass yet a fourth pivot pin 130. The pivot pin 134 may be sized to holes 162 such that pivot pin 134 makes a frictional fit with the opposite arms 120b of the yoke. The pivot pin mounts the vertically upright valve actuator rod or push rod 4d for rotation about the axis D of that pin.

The coil spring 124 has a wire diameter which is quite large, and an axial length of the compression coil spring which is relatively short, and thus the spring constant of that spring is quite large. The spring 127 is capable of providing, via the preload compression, an additional compression force, during rotation of the toggle links formed by the coil spring assembly 122 and the yoke 120 toward a center line position. The increased compressive force acting on the valve push rod 4d is adequate to maintain the normally closed valve closed and the normally open valve open, with the reverse snap-action of opening that normally closed valve and closing the normally open valve at the moment the toggle links 122, 120 of toggle linkage 125 pass over center, i.e., mutually longitudinally aligned between the pivot axes A, C of pivot pins 118, 132.

This occurs in the illustrated embodiment of FIG. 5 prior to the float rising to positions shown, as a result of accumulation of the liquid L within the chamber 2a of the pump body 2. The only differences in the embodiments are the utilization of a float arm 172 separate from the spring preload arms 116, and the use of crank arms 173 which make the physical connection therebetween as a force amplification mechanism. At the same time, the high compressive force of the preloaded compression coil spring 124 maintains a large closing force on the normally closed inlet valve 6 (having the stream or other high pressure gas acting against the movable valve member of pressure valve 6) to prevent any leakage of the steam or high pressure gas through the inlet valve into the chamber 2a prior to the mechanism 110 moving over center to the position shown in FIG. 5. Once that action takes place, however, with the float reaching the upper most position as shown in FIG. 5, the normally closed, gas inlet valve 6 opens fully and the normally open, gas vent valve 7 closes fully to prevent venting of the gas and ensuring that the high pressure gas entering the chamber 2a rapidly pumps the accumulated liquid L through the outlet fitting 9 of the pump body 2. As that liquid L is rapidly forced out of chamber 2a by the expanding gas pressure internally of the chamber 2a, the float 146 drops to the extend where the over-center mechanism pivots the upwardly oblique oppositely directed links 120, 122 first to an in-line position with the center line Y between pivot axes A, C, at which point the further compressed coil spring 124 snaps their upwardly oblique positions to downwardly opposite oblique positions (not shown). Arms 116 swing to the center line L position. Up to this point, there is no movement whatsoever of upwardly oblique yoke 120. The low friction pivot connections made by pins 134 and 132 to respective end caps 126, 128 of the spring assembly 122 permit the spring 124 to compress while freely pivoting about axes B, C without any movement whatsoever of the yoke 20 until the toggle linkage 125 reaches its center line position and with the energy of the further compressed coil spring 124 rapidly causing the coil spring 124 to expand and effecting snap action movement of both links, i.e., the coil spring assembly 122 and the yoke 120, to their opposite extreme oblique positions.

Similar to the first described embodiments, the mainframe side walls 114b have circular holes, identical to holes 23 of the first embodiment, which are aligned with each other, and which may limit movement of the opposite ends of pivot pin 130. The ends of the pivot pin 130 preferably stops short of contact with the periphery of the holes, through which the ends of the pin 130 respectively project, or the pin 130 or may bottom out selectively against the periphery in the up or down stroke thereof. The companion holes, like holes 27 of the first embodiment, within mainframe sidewalls 114b, which are generally aligned with pivot pin 134, are employed solely to provide access for tool in the assembly of the pivot pin 134 to the valve actuator rod or push rod 4d.

It should be appreciated that the mechanisms 10, 110 may be oriented other than with the axis of the valve actuator rod or push rod 4d vertical (whether oriented vertically upright or vertically downwardly), limited only to an arrangement which permits the float (46, 146) to actuate the mechanism (10, 110) as the liquid L accumulates and rises within the interior of the pump body 2 or drops during a gas pressure removal of that liquid. Such action must provide an adequate float movement capable of effecting over-center toggle linkage movement at the end of the float rise and at the end of the float drop, respectively. The mechanisms 10, 110 are required to utilize a compression force within a pivotable spring assembly or its equivalent and pivoting of opposite ends of the spring assembly as one link of the two link toggle linkage via low friction pivot pins or their equivalent. Preferably cooperating end caps or similar means are acted on by compressive force means interposed therebetween. Such spring assembly (22, 122) is preferably pivoted at an end remote from the yoke or lever of the toggle linkage (25, 125) to one end of the spring preload arms (16, 116), remote from their pivot connection to the mainframe (14, 114). The other link is also pivoted to the spring preload arms. Further, for the action desired, the opposite end of the spring assembly (22, 122) or its equivalent is required to be pivoted to the yoke, remote from the yoke pivot point about a pivot axis to a fixed member, such as the mainframe and (preferably common with that of the spring preload arms to the mainframe). Pivoting is via a second pivot pin or equivalent low friction pivot connection to that pin coupling the compression coil spring to the yoke. Additionally, the mechanism may incorporate the ability to variably preload or present the biasing force to relatively high preload values to ensure maintenance of sufficient pressure on the normally closed inlet valve acting oppositely to the gas pressure required by the liquid pump for fast pumping the accumulated liquid L from the interior of the pump body which may be on the order of 100 to 500 psia Such biasing means and link need not be a compression coil spring, it may have a presetable and increasing biasing force provided buy a torsion spring, a torsion bar (fixedly held at one end); a Belleville spring assembly, or a compressed gas-filled bag or like expandable enclosure. The Belleville spring assembly may use a plurality of axially aligned Belleville springs between end caps or the like. Alternatively, a plurality of opposite pole axially aligned permanent magnets may produce the compressive force. It is necessary, of course, that only the spring assembly or its equivalent pivot, but not the second link acting directly on the valve actuator rod or push rod, and that pivoting of the spring assembly or its equivalent be at both ends thereof and as friction-free as possible. Further, the connection of the valve actuator or push rod to the yoke may be on either side of the pivot connection of the yoke to the mainframe.

It should be understood, however, that various changes in form and proportion may be resorted to within the scope of the appended claims and the claims are not limited to the examples described in detail herein.

What is claimed is:

1. An automatic liquid pump comprising:

a sealed pressure vessel having a bottom and a top, the bottom including a liquid inlet opening and a liquid outlet opening, said top having a gas inlet adapted to be connected to a compressed gas source, a gas outlet, an inlet valve controlling the gas inlet, and an outlet valve controlling the gas outlet, a float within the housing, a snap-over toggle linkage valve actuating mechanism to alternately open and close the valves, first opening the gas outlet valve and second closing the gas inlet valve and then closing the gas outlet valve and opening the gas inlet valve, the improvement wherein said snap-over toggle valve actuating mechanism comprises a relatively fixed mainframe supported internally by said vessel, at least one compression force preload arm pivotably mounted to said fixed mainframe for pivoting about a first pivot axis A, a first toggle link pivoted at a first end to said mainframe about said first pivot axis A, a second toggle link *operatively* pivoted at a first end to said compression force preload arm at a point on said arm remote from said first pivot axis for pivoting about a second pivot axis C parallel to said first pivot axis A, pivot means pivoting a second end of said first toggle link to a second end of said second toggle link for pivoting about a third axis B, coupling means for operatively coupling said float to said compressive force preload arm at a point remote from said first axis A, and said second toggle link comprising compressible and expandable means for constantly applying a compressive force on said pivot connection between said first and second toggle links such that, upon pivoting of said at least one compressive force preload arm by rise and fall of liquid within said vessel about said first pivot axis A toward a position of longitudinal alignment with the longitudinal axis of the at least one compression force preload arm, an increasing compressive force is applied to said first toggle link to maintain said first toggle link stationary in one of two oblique, over-center positions with respect to a center line extending parallel to the longitudinal axis of said at least one compression force preload arm, and said second toggle link pivots about said axis B and said *compressible and expandable means* axially compresses until said first and second links become longitudinally aligned, and move across the center line Y, whereupon, both toggle links instantly snap over into oppositely oblique over-center positions and said second toggle link compressible and expansible means expands to dissipate the energy of compression.

2. The liquid pump as claimed in claim 1, wherein said second toggle link comprises a compression coil spring.

3. The liquid pump as claimed in claim 2, wherein a pair of end caps are respectively mounted on opposite end of said compression coil spring, and said end caps are pivotably coupled, respectively, to the second end of said first link at pivot axis B, and to said at least one compressive force preload arm at said pivot axis C, remote from said first pivot axis A.

4. The liquid pump as claimed in claim 3, wherein said mainframe comprises laterally spaced sidewalls, said at least one compressive force preload arm comprises a pair of spring preload arms, pivotably mounted adjacent respective sidewalls of said mainframe and extending outwardly therefrom and parallel thereto, said first link comprises a yoke haivng a base and a pair of laterally [spaces] *spaced* arms extending integral with the base and extending parallel to each other, outwardly of said base, said yoke being mounted within the sidewalls of said mainframe and integrally with said spring preload arms, a first pivot pin extends through aligned holes within said sidewalls of said mainframe, [through said arms of said yoke,] through aligned holes within respective arms of said yoke and through rtepective holes within the ends of said two spring preload arms for pivotably mounting said spring preload arms and said yoke on said mainframe for pivoting about said first axis A, a second pivot pin extends through aligned holes within the ends of said arms of said yoke remote from said first pivot axis A, and transversely through one of said end caps for pivoting said end cap on said yoke for pivoting about said third axis B, a third pivot pin extends transversely through aligned holes within said spring preload arms to the side of said second pivot pin, remote from said first pivot pin, and said third pivot pin projects through a transverse hole within said second end cap, and wherein the spacing between said second and third pivot pins is such that the compression coil spring is maintained under initial compression to provide said compressive force which continuously acts on said pivot connection between said first end cap and said yoke.

5. The liquid pump as claimed in claim 4, wherein a fourth pivot pin extends through aligned holes within said arms of said yoke, at a distance spaced from said first pivot pin, a valve actuator rod a transverse hole within an end of said rod, said rod is centered between the arms of said yoke, and receives said fourth pivot pin such that, over-center snap-action movement of said yoke from one extreme oblique position to the other causes said valve actuator rod shift between extreme positions along its axis *to* alternately open and close said valves.

6. The liquid pump as claimed in claim 1, further comprising means for adjusting the preload compression force means of said second toggle link.

7. The liquid pump as claimed in claim 2, further comprising means for adjusting the preload compression force means of said second toggle link.

8. The link pump as claimed in claim 3, further comprising means for adjusting the preload compression force means of said second toggle link.

9. The liquid pump as claimed in claim 4, further comprising means for adjusting the preload compression force means of said second toggle link.

10. The liquid pump as claimed in claim 9, wherein said pair of spring preload arms includes a plurality of longitudinally spaced holes sized to receive said third pivot pin, and constituting the means for adjusting the preload compression force by variably positioning said second end cap relative to said first end cap and for permitting expansion or causing contraction of said compression coil spring extending between said first and second end caps.

11. The liquid pump as claimed in claim 1, wherein said float is fixedly coupled to one end of a float arm, an end of the float arm opposite to said float is pivoted to the mainframe remote from said float, and wherein a crank arm is pivoted at one end to the float arm at the side of the pivot axis of the float arm on said mainframe remote from said float, and at an opposite end to said at least one compression force preload arm remote from the pivot connection of said at least one compression preload arm to said mainframe, such that said crank arm and said float arm constitute a force amplification system for imparting a significant force, as a result of float rise and fall, to said at least one compression force preload arm.

12. The liquid pump as claimed in claim 11, wherein the second end of the crank arm is pivoted to the at least one compression preload arm commonly at said pivot axis C.

13. A leak-proof, preloaded, high-biasing force float-operated over-center valve actuating mechanism for use in a sealed pressure vessel having a bottom and a top, the bottom including a liquid inlet opening and liquid outlet opening, said top having a gas inlet adapted to be connected to a compressed gas source, *a* gas outlet, an inlet valve controlling the gas inlet, an outlet valve controlling the gas outlet, said valve actuating mechanism alternately opening and closing the valves by first opening the gas outlet valve and second closing the gas inlet valve and, under reverse snap-over toggle valve actuation closing the outlet valve and the opening the gas inlet valve, said snap-over toggle valve actuating menchanism comprising:

a relatively fixed mainframe [supported] *for support* internally of said vessel, at least one compression force preload arm pivotably mounted to said fixed mainframe for pivoting about a first pivot axis A, a first toggle link pivoted at a first end to said mainframe about said first pivot axis A, a second toggle link *operatively* pivoted at a first end to said compression force preload arm at a point on said arm remote from said pivot axis, for pivoting about a second pivot axis C, parallel to said first pivot axis A, pivot means pivoting a second end of said first toggle link to a second end of said second toggle link for pivoting about a third axis B, parallel to said first and second pivot axes A, C, coupling means for operatively coupling said float to said compressive force preload arm at a point remote from said first axis A, and said second toggle link comprising compressible and expandable means for constantly applying a compressive force on said pivot connection between said first and second toggle links such that, upon pivoting of said at least one compressive force preload arm by rise and fall of liquid within said vessel about said first pivot axis A toward a position of longitudinal alignment with the longitudinal axis of the at least one compression force preload arm, an increasing compressive force is applied to said first toggle link to maintain said first toggle link stationary in one of two oblique, over-center poositions with respect to a center line Y extending parallel to the longitudinal axis of said at least one compression force preload arm, and said second toggle link pivots about said axis B and *said compressible and expandable means* axially compresses until said first and second links become longitudinally aligned, and move across the center line Y, whereupon, both toggle links instantly snap over into oppositely oblique, over-center positions and said second toggle link compressible and expansible means expands to dissipate the energy of compression.

14. The mechanism as claimed in claim 13, wherein said second toggle link comprises a compression coil spring.

15. The mechanism as claimed in claim 14, wherein a pair of end caps are respectively mounted on opposite ends of said compression coil spring, and said end caps are pivotably coupled, respectively, to the second end of said first link at pivot axis B, and to said at least one compressive force preload arm at said pivot axis C, remote from said first pivot axis A.

16. The mechanism as claimed in claim 15, wherein said mainframe comprises laterally spaced sidewalls, said at least one compressive force preload arm comprises a pair of spring preload arms, pivotably mounted adjacent respective sidewalls of said mainframe and extending outwardly therefrom and parallel thereto, said first link comprises a yoke having a base and a pair of laterally spaced arms extending integral with the base and extending parallel to each other, outwardly of said base, said yoke being mounted within the sidewalls of said mainframe and integrally with said spring preload arms, a first pivot pin extends through aligned holes within said sidewalls of said mainframe, through aligned holes within respective arms of said yoke and through holes within the ends of said two spring preload arms for pivotably mounting said spring preload arms and said yoke on said mainframe for pivoting about said first axis A, a second pivot pin extends through aligned holes within the ends of said arms of said yoke remote from said first pivot axis A, and tansversely through one of said end caps for pivoting said end cap on said coil compression spring proximate to said yoke for pivoting about said third axis B, a third pivot pin extends transversely through aligned holes within said spring preload arms to the side of said second pivot pin, remote from said first pivot pin, and said third pivot pin projects through a transverse hole within said second end cap, and wherein the spacing between said second and third pivot pins is such that the compression coil spring is maintained under initial compression to provide said compressive force continuously to provide said compressive force which continuously acts on said pivot connection between said first end cap and said yoke.

17. The mechanism as claimed in claim 16, wherein a fourth pivot pin extends through aligned holes within said arms of said yoke, at a distance spaced from said first pivot pin, a valve actuator rod has a transverse hole within an end of said rod, said rod is centered between the arms of said yoke, and receives said fourth pivot pin such that, over-center snap-action movement of said yoke from one extreme oblique position to the other causes said value actuator rod to shift between extreme positions along its axis to alternately open and close said valves.

18. The mechanism as claimed in claim 1, further comprising means for adjusting the preload compression force means of said second toggle link.

19. The mechanism as claimed in claim 14, further comprising means for adjusting the preload compression force means of said second toggle link.

20. The mechanism as claimed in claim 15, further comprising means for adjusting the preload compression force means of said second toggle link.

21. The mechanism as claimed in claim 16, further comprising means for adjusting the preload compression force means of said second toggle link.

22. The mechanism as claimed in claim 21, wherein said pair of spring preload arms includes a plurality of longitudinally spaced holes sized to receive said third pivot pin, and constituting the means for adjusting the preload compression force by variably positioning said second end cap relative to said first end cap and for permitting expansion or causing contraction of said compression coil spring extending between said first and second end caps.

23. The mechanism as claimed in claim 13, wherein said float is fixedly coupled to one end of a float arm, an end of the float arm opposite to said float is pivoted to the mainframe remote from said float, and wherein a crank arm is pivoted at one end of the float arm at the side of the pivot axis of the float arm on said mainframe remote from said float, and at an opposite end to said at least one compression force preload arm remote from the pivot connection of said at least one compression preload arm to said mainframe, such that said crank arm and said float arm constitute a force amplification system for imparting a significant force, as a result of float rise and fall, to said at least one compression force preload arm.

24. The mechanism as claimed in claim 23, wherein the second end of the crank arm is pivoted to the at least one compression preload arm commonly at said pivot axis C.

*25. A leak-proof, preloaded, high-biasing force float-operated over-center valve actuating mechanism for use in a sealed pressure vessel having a bottom and a top, the bottom including a liquid inlet opening and a liquid outlet opening, said top having a gas inlet adapted to be connected to a compressed gas source, a gas outlet, an inlet valve controlling the gas inlet, an outlet valve controlling the gas outlet, said valve actuating mechanism alternately opening and closing the valves by first opening the gas outlet valve and second closing the gas inlet valve and, under reverse snap-over toggle valve actuation closing the outlet valve and opening the gas inlet valve, said snap-over toggle valve actuating mechanism comprising:*

*a relatively fixed mainframe for support internally of said vessel, at least one compression force preload arm pivotably mounted to said fixed main frame for pivoting about a first pivot axis A, a first toggle link operatively pivoted at a first end to said compression force preload arm at a point on said arm remote from said first pivot axis, a second toggle link operatively pivoted at a first end to said compression force preload arm, for pivoting about a second pivot axis C, parallel to said first pivot axis A, pivot means pivoting a second end of said first toggle link to a second end of the second toggle link for pivoting about a third axis B, parallel to said first and second pivot axes A, C, a compression coil spring, means for operatively pivotably coupling said compression coil spring at one end to said at least one compression force preload arm and at an opposite end to said first toggle link for applying a compressive force on said pivot connection between said first and second toggle links such that, upon pivoting of said at least one compressive force preload arm by rise and fall of liquid within said vessel about said first pivot axis A towards a position of parallel alignment with the longitudinal axis of the at least one compression force preload arm, an increasing compressive force is applied to said first toggle link to maintain said first toggle link stationary in one of two oblique, over-center positions with respect to a center line extending parallel to the longitudinal axis of said at least one compression force preload arm, and said compression spring axially compresses until said first and second links become longitudinally aligned and move across the center line Y, whereupon, both toggle links instantly snap over into oppositely oblique over-center positions and said compression coil spring expands to dissipate the energy of compression.*

* * * * *